(12) United States Patent
Marozas et al.

(10) Patent No.: US 11,824,891 B2
(45) Date of Patent: Nov. 21, 2023

(54) DETECTING BOTNETS

(71) Applicant: Cujo LLC, El Segundo, CA (US)

(72) Inventors: Leonardas Marozas, Vilnius (LT);
Filip Savin, Vilnius (LT); Matteo Cafasso, Helsinki (FI); Santeri Kangas, Kirkkonummi (FI); Sean Tiernan, El Segundo, CA (US)

(73) Assignee: Cujo LLC, Walnut, CA (US)

( * ) Notice: Subject to any disclaimer, the term of this patent is extended or adjusted under 35 U.S.C. 154(b) by 90 days.

(21) Appl. No.: 17/175,872

(22) Filed: Feb. 15, 2021

(65) Prior Publication Data
US 2022/0263861 A1 Aug. 18, 2022

(51) Int. Cl.
  *G06F 21/00* (2013.01)
  *H04L 9/40* (2022.01)
(52) U.S. Cl.
  CPC ...... *H04L 63/1458* (2013.01); *H04L 63/0236* (2013.01); *H04L 63/1425* (2013.01)
(58) Field of Classification Search
  CPC ............. H04L 63/1458; H04L 63/0236; H04L 63/1425
  See application file for complete search history.

(56) References Cited

U.S. PATENT DOCUMENTS

| | | | | |
|---|---|---|---|---|
| 7,661,136 B1 * | 2/2010 | Spielman | ................ | H04L 43/00 726/22 |
| 8,402,543 B1 * | 3/2013 | Ranjan | ................ | H04L 63/1416 713/100 |
| 9,516,039 B1 * | 12/2016 | Yen | ..................... | H04L 63/1425 |
| 9,628,498 B1 * | 4/2017 | Aziz | ................... | H04L 63/1425 |
| 9,917,852 B1 * | 3/2018 | Xu | ...................... | H04L 63/1483 |
| 10,445,738 B1 * | 10/2019 | Waters | ................ | G06Q 50/265 |
| 2007/0289010 A1 * | 12/2007 | Thomas | .............. | H04L 63/0245 726/13 |

(Continued)

FOREIGN PATENT DOCUMENTS

WO  WO-2018164701 A1 *  9/2018  ............. G06N 20/20

OTHER PUBLICATIONS

European Patent Office Rule 71(3) Communication, Notice of Intention to Grant, for EP Patent Application No. 22156540.1, dated Mar. 30, 2023, 40 pages.

(Continued)

*Primary Examiner* — Michael M Lee
(74) *Attorney, Agent, or Firm* — Dority & Manning, P.A.

(57) ABSTRACT

A network apparatus maintains a data repository comprising network traffic data related to a plurality of user devices, the network traffic data being collected from a plurality of Network Service Providers (NSPs). A subset of the plurality of user devices are detected to be communicating with one or more same endpoint devices based on analysing the network traffic data. A number of historical connections between each user device of the subset of the plurality of user devices and the one or more endpoint devices is determined based on analysing historical connection data maintained in the data repository, and in response to detecting that the number of historical connections between the subset of the plurality of user devices and the one or more endpoint devices exceeds a predetermined threshold, the one or more endpoint devices are identified as a suspected botnet.

21 Claims, 5 Drawing Sheets

(56) References Cited

U.S. PATENT DOCUMENTS

| | | | | |
|---|---|---|---|---|
| 2008/0080518 A1* | 4/2008 | Hoeflin | ............... | H04L 63/1425 |
| | | | | 370/395.42 |
| 2012/0204264 A1* | 8/2012 | Jiang | ....................... | H04L 41/12 |
| | | | | 726/23 |
| 2015/0373039 A1* | 12/2015 | Wang | .................. | H04L 63/1425 |
| | | | | 726/23 |
| 2018/0357563 A1* | 12/2018 | Kurian | .................... | G06N 20/00 |
| 2020/0092181 A1* | 3/2020 | Thiagarajan | .......... | H04L 43/062 |
| 2020/0366689 A1* | 11/2020 | Lotia | .................... | H04L 63/1458 |
| 2021/0266331 A1* | 8/2021 | Meshi | ................. | H04L 63/0263 |

OTHER PUBLICATIONS

Examination Report for Canadian Patent Application No. 3,148,193, mailed Aug. 31, 2023, 4 pages.

* cited by examiner

DETECTING BOTNETS

TECHNICAL FIELD

The present application relates generally to network security, and specifically to detecting botnets in a computer network.

BACKGROUND

Botnets are known to have been used in numerous malicious purposes such as for performing Distributed Denial-of-Service (DDoS) attacks, stealing data, sending spam and allowing unauthorized parties accessing a device or a system and its connections. Thus, they represent a serious cybersecurity threat for organizations and computer systems today.

It can be desirable to have reliable solutions enabling detection of cybersecurity threats, such as botnets.

SUMMARY

According to an aspect of the invention there is provided a method as specified in claim 1.

According to another aspect of the invention, there is provided an apparatus in a computer network system as specified in claim 11.

According to another aspect of the invention, there is provided a non-transitory computer-readable medium comprising stored program code, the program code comprised of computer-executable instructions that, when executed by a processor device, causes the processor device to operate as specified in claim 21.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for the purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message", and does not imply a priority, a type, an importance, or other attribute, unless otherwise stated herein.

As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

Malicious traffic, as well as botnet, communication is typically detected and prevented by comparing traffic endpoint (IP) addresses to known and confirmed Indicator of Compromise (IoC) database, ingested from commercial and Open Source Intelligence (OSINT) third party threat intelligence providers. Many protection mechanisms thus often rely on third party detection sensors for a big part of the functionality to enable using as fresh data as possible, as well as internal tooling created around fetching, parsing, reviewing and including fresh IoCs detected from Malware Information Sharing Platform (MISP) or other communities alike to blocklists. The problem related to the dependency on third party threat intelligence data causes botnet detection to be completely reactive and depending on fast turnaround of external parties to provide IoCs for ingestion. An embodiment of the present invention offers a solution to the reactive part and reduces dependency of third party threat intelligence providers by proposing a method to detect new and emerging botnets by using data flowing in a data repository, such as a CUJO® Labs Data Lake solution, comprising network traffic data related to a plurality of user devices, and where the network traffic is collected from a plurality of Network Service Providers (NSP). An embodiment thus enables pairing a reactive security solution with a proactive one focused in detecting botnets which may yet be unknown to the security community. The ingestion and storage of network flow data from millions of identified devices of different models into a data lake enables detection of anomalies in network behaviour. An embodiment of the present invention provides a method to detect previously undiscovered botnets that can be used to improve protection against botnets by generating threat intelligence data on emerging botnets, their command and control centres and malware distribution points.

Figure 1:
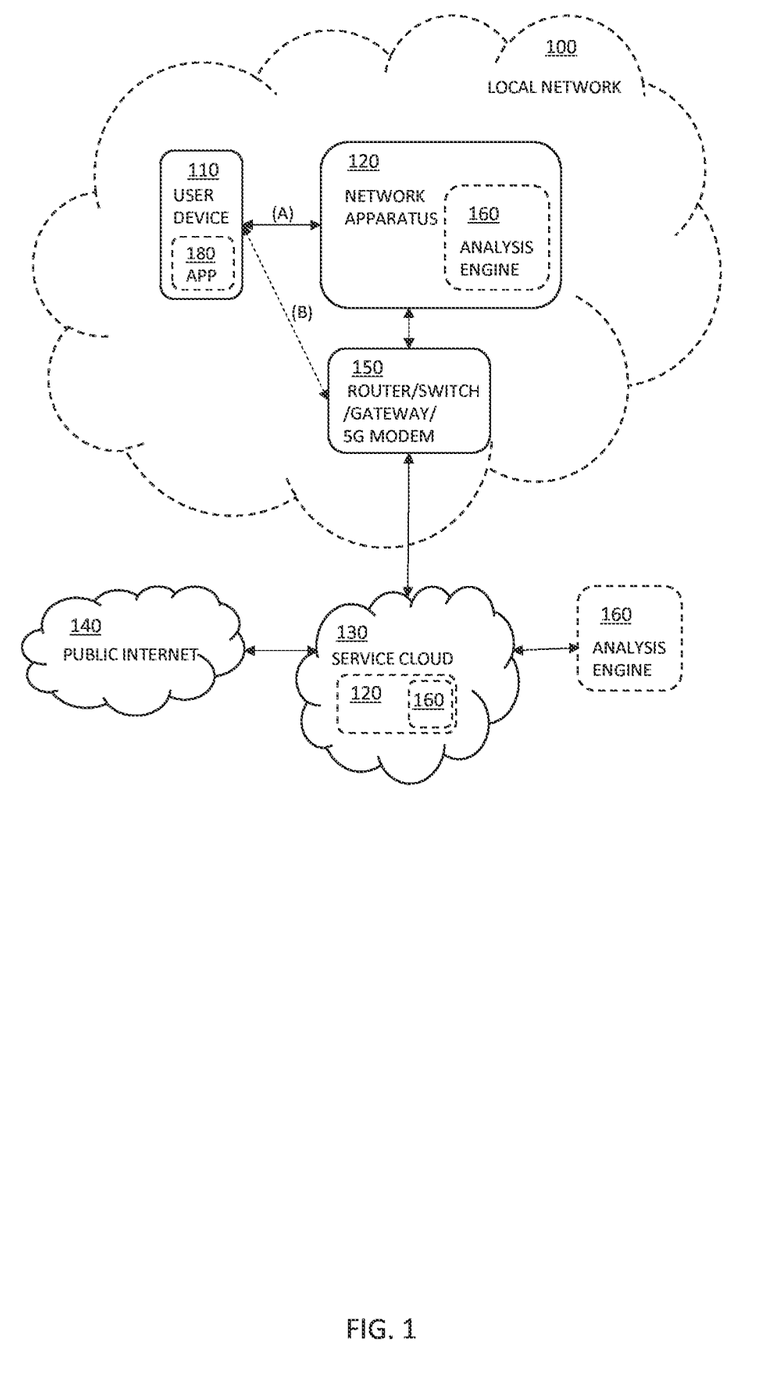
FIG. 1 is a block diagram illustrating an example system environment for a network apparatus in a computer network system.

FIG. 1 illustrates schematically an example of a system environment for a network apparatus 120. The system environment illustrated in FIG. 1 includes a local network 100 that may include one or more devices 110 with a client application 180, the network apparatus 120, a local router/switch 150, and an analysis engine 160. The example system also includes a service cloud 130, such as a network operator's/network service provider's (NSP) cloud and the Internet 140. The analysis engine 160 may reside in the local network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the device 110 may communicate (A) via the network apparatus 120 residing in the local network 100. In another embodiment, the device 110 may communicate (B) directly via a network gateway or a modem 150, for example when the device is not in the local network 100. In an embodiment, the network operators may deploy a service platform on their broadband gateways 150 provided to customers and in their own cloud environments 130. The user device(s) 110 may also be configured to use the services provided by the service cloud 130 by one or more applications 180 installed on the device(s) 110.

The device 110 may be any device having Internet communication capabilities, such a smartphone, laptop, storage device or other IoT device. The network apparatus 120 collects information (e.g., about the local network 100) including data about the network traffic through the local network 100 and data identifying devices in the local network 100, such as any smart appliances and user devices 110. The network apparatus 120 is configured to receive traffic control instructions from the analysis engine 160 and to process network traffic based on the traffic control instructions. Processing the network traffic through the local network 100, for example, can include restricting where network traffic can travel, blocking network traffic from entering the local network 100, redirecting a copy of network traffic packet or features of those packets to the analysis engine 160 for analysis (e.g., for malicious behaviour), or quarantining the network traffic to be reviewed by a user (e.g., via the user device 110) or network administrator. In some embodiments, the functionality of the network apparatus 120 is performed by a device that is a part of the local network 100, while in other embodiments, the functionality of the network apparatus 120 is performed by a device outside of the local network 100.

The network apparatus 120 may be configured to monitor traffic that travels through the local network 100. In some embodiments, the network apparatus 120 can be a device that is a part of the local network 100. The network apparatus 120 can be connected to the local network 100 using a wired connection (e.g., via an Ethernet cable connected to a router) or using a wireless connection (e.g., via a Wi-Fi connection). In some embodiments, the network apparatus 120 can comprise multiple devices. In some embodiments, the network apparatus 120 can also perform the functions of the local network router 150 for the local network 100.

In some embodiments, the network apparatus 120 may intercept traffic in the local network 100 by signalling to the user device 110 that the network apparatus 120 is router 150. In some embodiments, the network apparatus 120 replaces the default gateway or gateway address of the local network 100 with its own internet address. In some embodiments, the local network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the local network 100.

The analysis engine 160 may receive and analyze network traffic data (e.g., forwarded by the network apparatus 120) associated with devices on the computer network. The analysis engine 160 may be implemented within a remote system (e.g., a cloud server) or within the local network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the local network router 150 may be configured to forward network traffic to the analysis engine 160. In some embodiments, the analysis engine 160 communicates with other devices on the computer network. In some embodiments, the analysis engine 160 is integrated into the network apparatus 120.

The local network 100 is a local area network (LAN) that comprises the one or more devices 110, network apparatus 120, and local network router 150. The local network 100 may be used for a number of purposes, including a home network or a network used by a (small-medium) business. The local network 100 is connected to the internet 140, allowing devices within the local network 100, including the user device 110, to communicate with devices outside of the local network 100. The local network 100 may be a private network that may require devices to present credentials to join the network, or it may be a public network allowing any device to join. In some embodiments, other devices, like personal computers, smartphones, or tablets, may join local network 100.

The internet 140 and the local network 100 may comprise any combination of LANs and wide area networks (WANs), using both wired and wireless communication systems. In some embodiments, the internet 140 and the local network 100 use standard communications technologies and protocols. Data exchanged over the internet 140 and the local network 100 may be represented using any suitable format. In some embodiments, all or some of the communication links of the internet 140 and the local network 100 may be encrypted using any suitable technique or techniques.

The user device 110 is a computing device capable of receiving user input as well as transmitting and/or receiving data via the Internet 140 or local network 100. In some embodiments, a user device 110 is a conventional computer system, such as a desktop or a laptop computer. Alternatively, a user device 110 may be a device having communication functionality, such as a personal digital assistant (PDA), a mobile telephone, a smartphone, web camera, storage device or another IoT-device. The user device 110 is a network device configured to communicate with the Internet 140 or local network 100. In some embodiments, the user device 110 executes an application (e.g., application 180) allowing a user of the user device 110 to interact with other network devices, such as the smart appliances, the network apparatus 120, the router 150, or the analysis engine 160. For example, the user device 110 executes a browser application to enable interaction between the user device 110 and the network apparatus 120 via the local network 100.

The client application 180 is a computer program or service configured to run on the user device 110. For example, the application 180 is a web browser, a mobile game, an email client, or a mapping program. The user device 110 can have a vendor defined number of applications 180 installed or the user can extend the number of applications according to their needs. The application 180 may communicate, via the user device 110, with devices inside and outside of the local network 100.

Figure 2:
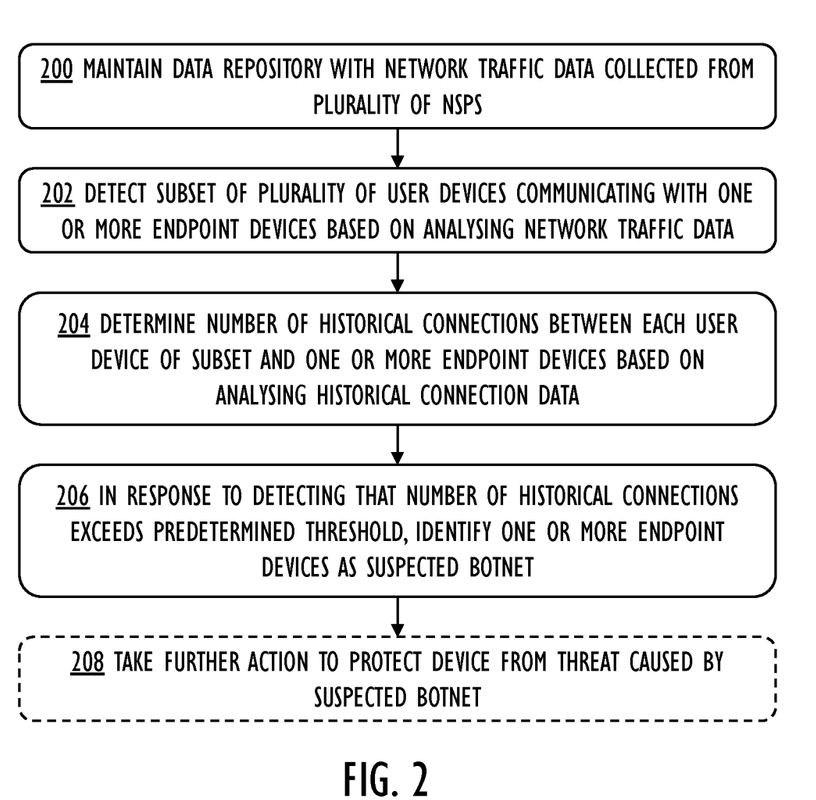
FIG. 2 is a flowchart illustrating a process, according to one embodiment.

FIG. 2 is a flow diagram illustrating an embodiment of a method.

In 200, a data repository comprising network traffic data related to a plurality of user devices is maintained. The network traffic data is collected from a plurality of Network Service Providers (NSP).

In 202, a subset of the plurality of user devices is detected to start communicating with one or more same endpoint devices based on analysing the network traffic data.

In 204, a number of historical connections between each user device of the subset of the plurality of user devices and the one or more endpoint devices is determined based on analysing historical connection data maintained in the data repository.

In 206, in response to detecting that the number of historical connections between the subset of the plurality of the user devices and the one or more endpoint devices exceeds a predetermined threshold, the one or more endpoint devices are identified as a suspected botnet.

In 208, further action is taken to protect one or more computer devices of a computer network from a security threat caused by the suspected botnet. In an embodiment, taking further action comprises one or more of: blocking or preventing communication with the suspected botnet, conducting further analysis on the network traffic data and/or the suspected botnet.

In an embodiment, in case communication with the suspected botnet has been blocked or prevented, the communication may be resumed when the suspected botnet is determined to be benign on the basis of further analysis.

In an embodiment, the suspected botnet is further analysed to whitelist any endpoint devices that are related to a known service.

In an embodiment, the suspected botnet is further analysed to determine whether the subset of the plurality of user devices had previous communications with the suspected botnet before. In response to detecting that a predetermined amount of the subset of the plurality of user devices had no previous communications with the suspected botnet before, the suspected botnet may be determined malicious.

In an embodiment, in response to detecting that the reputation of the suspected botnet is unknown or known to be malicious, the suspected botnet may be determined malicious.

In an embodiment, the method further comprises selecting one or more communication ports for monitoring the network traffic data, number of days N to monitor, a minimal user device count D to monitor, and the subset of the plurality of user devices. Further, the one or more endpoint devices are extracted from network communications to monitored ports during the last N days by using the data repository. The one or more endpoint devices may be reduced/filtered by eliminating endpoint devices fitting a common network profile for respective device models of the user devices and/or by eliminating trusted destinations.

In an embodiment, a number of user devices of the subset of the plurality of user devices that communicated with the one or more endpoint devices may be calculated. It may be determined which user devices of the subset of the plurality of user devices communicated with the one or more endpoint devices and which user devices did not. The subset of the plurality of user devices are formed by grouping by one or more of: a device model, a device vendor, an operating system, and any other common property of the user devices. In response to detecting one or more user devices of the subset of the plurality of user devices having had no previous communication with the one or more endpoint devices based on the determination, an infection that is caused by a new botnet appearing in less than N days or by an existing botnet changing a Command and Control (C&C) communication channel may be determined. In response to detecting one or more user devices of the number of user devices having had previous communication with the one or more endpoint devices based on the determination, it may be determined that an emerging botnet is spreading.

In an embodiment, the historical connection data maintained in the data repository is collected during a predetermined time range and is related to a predetermined minimum number of the plurality of user devices. The determining of the number of historical connections between each user device of the subset of the plurality of user devices and the one or more endpoint devices may further comprise grouping the historical connections by a destination Internet Protocol (IP) address and a destination communication port between a present date and a past date within the predetermined time range; and filtering results from the grouping to return destination Internet Protocol (IP) address and destination communication port combinations, which are equal to or greater in number than the predetermined minimum number of the plurality of user devices.

In an embodiment, the determining whether a destination Internet Protocol (IP) address and/or a destination communication port of the one or more endpoint devices identified as a suspected botnet are malicious may comprise one or more of: ensuring that the destination Internet Protocol (IP) address is not owned by a company listed in a trusted list of top corporations worldwide, ensuring that the destination communication port of the one or more endpoint devices identified as the suspected botnet is not associated with a known service, searching for Classless Inter-Domain Routings (CIDRs) of known bad hosting providers implying malicious intent, and generating a query to determine if in the predetermined time range a subset of the one or more endpoints generated a Denial-of-Service (DOS) attack against a same user device of the plurality of user devices.

In an embodiment, in response to detecting a connection between a subset of the plurality of user device and a suspected malicious destination Internet Protocol (IP) address, full network traffic may be requested to be captured for a predetermined time range for each user device of the subset of the plurality of the user devices, and the requested full network traffic may be further analysed to verify malicious activity.

In an embodiment, the method may further comprise determining that one or more Internet Protocol (IP) addresses are linked to a known bulletproof hosting service provider, and in response to detecting the subset of the plurality of the user devices communicating with the known bulletproof hosting service provider, the one or more endpoint devices may be identified as the suspected botnet, wherein the plurality of the user devices communicate with the known bulletproof hosting service provider over one or more standard communication ports.

Figure 3:
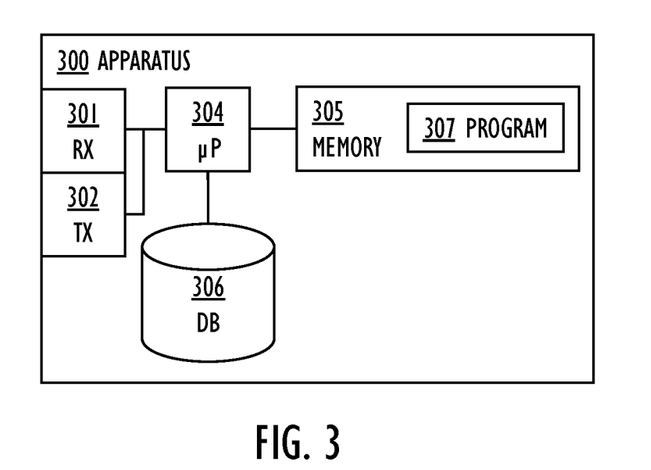
FIG. 3 is a block diagram of an apparatus, according to one embodiment.

Turning now to FIG. 3 that is showing an example of a network apparatus such as a router, a switch, a 5G modem, or other network level apparatus.

A processor device 304 is provided that is configured to maintain a data repository comprising network traffic data related to a plurality of user devices, the network traffic data being collected from a plurality of Network Service Providers (NSP). The processor device 304 is further configured to detect that a subset of the plurality of user devices is communicating with one or more same endpoint devices based on analysing the network traffic data, to determine a number of historical connections between each user device of the subset of the plurality of user devices and the one or more endpoint devices based on analysing historical connection data maintained in the data repository, and in response to detecting that the number of historical connections between the subset of the plurality of user devices and the one or more endpoint devices exceeds a predetermined threshold, identify the one or more endpoint devices as a suspected botnet. In some embodiments, at least part of the analysis can be implemented in some other device external to the apparatus 300.

In an embodiment, the processor device 304 is configured to store data to the database 306. The database 306 is shown in this example as being located at the apparatus 300, but it will be appreciated that the apparatus 300 may alternatively access a remote database. The database 306 may comprise necessary data collected from user devices collected from a plurality of NSPs.

The apparatus 300 is provided with a receiver 301 that receives the connection requests and responses. A transmitter 302 is also provided for communication with the user device and/or the outside server.

In the above description, the apparatus 300 is described as having different transmitter and receiver. It will be appreciated that these may be disposed in any suitable manner, for example in a single transmitter and receiver, a transceiver and so on. Similarly, a single processor device 304 is described but it will be appreciated that the function of the processor device may be performed by a single physical processor device or by more than one processor device.

The apparatus 300 is also provided with a non-transitory computer readable medium in the form of a memory 305. The memory may be used to store a computer programme 307 which, when executed by the processor device 304, causes the processor device 304 to perform the functions described above. The computer program 307 may be provided from an external source. In an embodiment, at least some or even all of the functions of the method can be implemented in any apparatus, for example the user device or a server.

Figure 4:
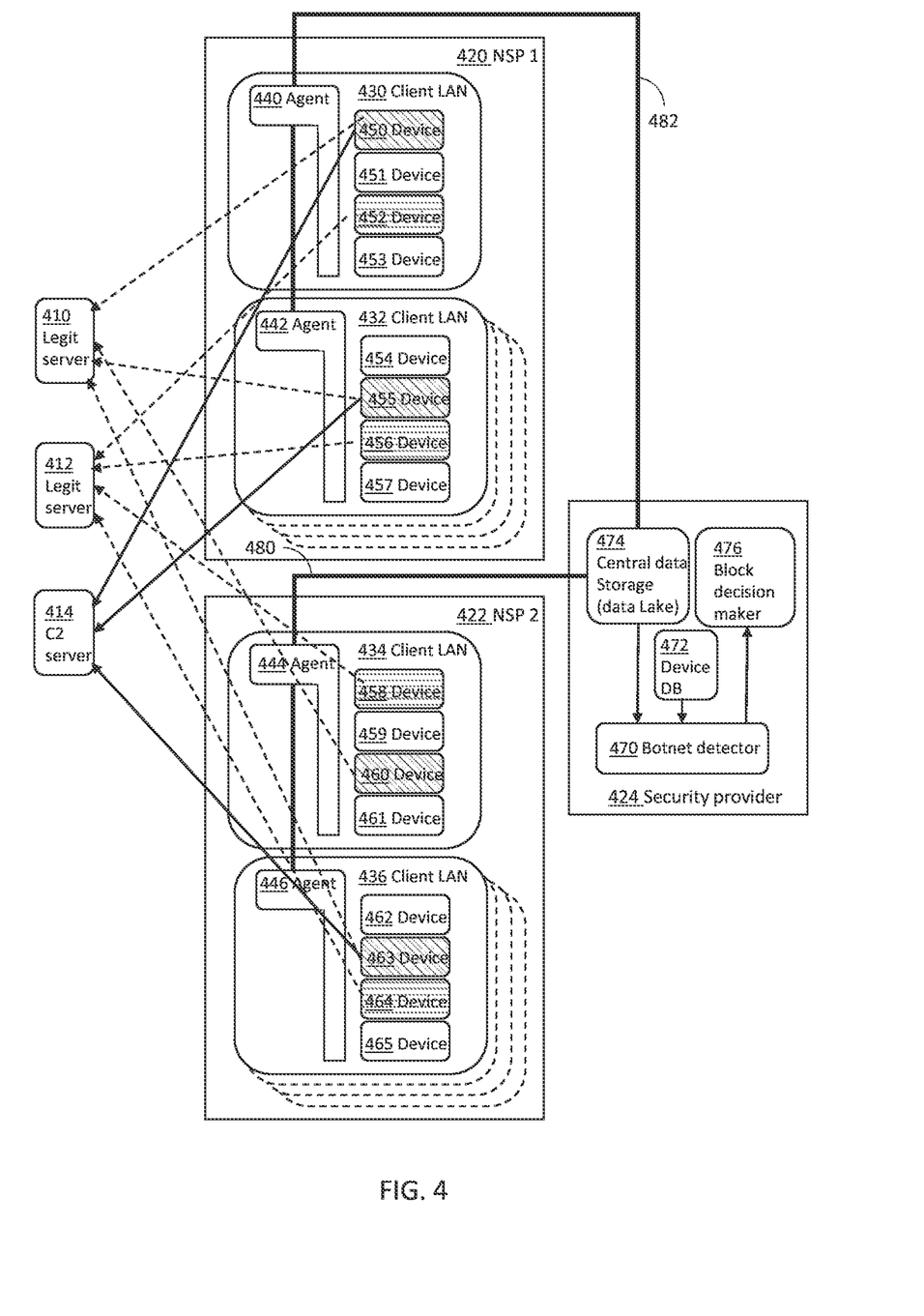
FIG. 4 is a block diagram illustrating an example system environment, according to one embodiment.

FIG. 4 illustrates an example system environment, according to one embodiment.

The system environment illustrated in FIG. 4 includes local networks (client LAN) 430-436 that may each include one or more devices 450-465 and one or more agent nodes 440-446. The example system also includes a security provider 424 that comprises a data repository/central data storage 474, such as a data lake of network traffic flow data, a device database 472, a botnet detector 470 and a block decision maker engine 476. There may also be more than one botnet detector, decision engine or other analysis engines thus enabling at least part of the analysis being processed in more than one entity. Alternative embodiments may include more, fewer, or different components from those illustrated in FIG. 4 example, and the functionality of each component may be divided between the components differently from the description below. Additionally, each component may perform their respective functionalities in response to a request from a human, or automatically without human intervention. The example system also includes legit servers 410, 412 and a C2 server 414. The C2 server 414 in this example illustrates a command and control center that is used to control a botnet.

Specific device models are denoted with diagonal/horizontal stripes or a white fill. Network data flows 480, 482 illustrate data of device network data flows, data for device identification, and traffic blocking decision/instruction data between the agent nodes 440-446 and the security provider 424. Common (normal) traffic for specific device models is denoted with dashed lines between the devices and the legit servers 410, 412.

Cujo® Labs Data Lake is an example of a data repository/central data storage 474 that provides possibility to explore, understand and correlate data coming from interconnected devices on NSP environments. It includes application usage, content access, security events, threats, and serves as a knowledge repository containing information from multiple NSP environments. Ability to visualize and analyze this data with appropriate tooling provides visibility into network traffic and emerging network traffic anomalies from billions interconnected devices. The ingestion and storage of network flow data from millions of identified devices of different models into data lake enables detecting anomalies in network behavior. The network flow data in these embodiments comprises information on source and destination of network communication in a time frame. Embodiments of the invention enable detection of undiscovered botnets and tackling the time gap that exist in between botnet detection, analysis/confirmation, adding to threat actor list and distributing the list.

With the increasing coverage and data from agent nodes 440-446 sent to the data repository 474 that is a central data storage point (such as data warehouse, data lake, database) to be stored in a contract-defined, query-able format, it is possible to detect any abnormalities in traffic that might be caused by activities, related to emerging botnets.

Typical device-side botnet operation flow includes first a device being exploited, then a bot being downloaded from some malware distribution point, the bot starting and registering its presence in the C&C server, bot receiving a command (e.g., perform scanning, infection, spamming, DDoS, or other type of attack) from the C&C and executing it, and then repeating this action until the bot is removed. Devices in botnet often use the same set of addresses for communications with malware distribution points and C&C servers. Discovering these sets of addresses enables blocking the malware distribution points which in turn enables preventing bot injection into exploited devices. It also enables blocking the C&C server thus preventing requests of malicious activity execution by infected devices.

Network data from different devices allows seeing the big picture of global communications. Applying specific algorithms based on knowledge of botnet operations on ingested network flow data can reveal activities that can be related to emerging botnets.

Detection can be triggered on traffic to sets of specific IP addresses, ports, domains, other network communication descriptive features or combination of some or all of them. With access to historical data in a central data storage point from the same devices, identified by obfuscated device identifiers, it is possible to determine such communication patterns as abnormality.

A list of devices that communicates with these endpoints can be used to isolate those devices in their networks and alert their respective owners about vulnerabilities present in their devices. To determine these IoC's (malware distribution points, C&C servers), abnormal traffic needs to be distinguished based on the assumption that the botnet is growing—bots are spreading by exploiting vulnerabilities in certain software/hardware used by certain devices.

Central data storage 474 provides means to query data in a defined format and create visualizations using appropriate data visualization tools. Such functionality allows detection of a subset of devices that suddenly starts communicating to the same endpoints when previously no history of contact was witnessed. Additional sign of possibly illicit abnormality is detection of usage of non-standard ports (not using the ports of known services in communication).

In an embodiment, records of external facing network traffic designated by obfuscated device identifier, destination IP, destination port, possible other descriptive network features and timestamp exist in the central data storage 474 when central data storage has details of full network traffic of agent nodes/sensors 440-446.

In an embodiment, one or more devices 450-465 are from consumer home environments, connected via the agent nodes/sensors 440-446. In an embodiment, the devices 450-465 are well diversified thus covering popular to niche devices in significant numbers. In an embodiment, the devices 450-465 are also geographically well dispersed (spread out across a country, or the globe), and the device count is sufficiently large (e.g., greater than 300 million in an example).

In an embodiment, the central data storage 474 is continuously updated with network flow records containing a unique device identifier, destination IP, port, and timestamp (when the communication was spotted) for a predetermined (configured) number of days. In an embodiment, historical records going back a set number of days in the specified format for each identifiable device are available in the central data storage (no signatures are needed which includes and is not limited to C&C communication traffic pattern or known malicious activity).

In the example of FIG. 4, a subset of devices of certain device models 450, 455, 463 start connecting to a same suspicious endpoint (C2 server 414 in this example).

In an embodiment, when a device gets infected, it connects to malware distribution points to download the bot payload and then connects to C&C server. With the assumption that the number of infected devices is growing, we can identify sets of destinations (IPs and ports) in network flow data that should contain emerging botnet's IoC's:

At the point in time, the number of network flows to the same destinations is increasing for a certain subset of devices (like devices of the same model).

Traffic is not normal (not historically common for the subset of devices in question).

Resulting sets can contain legitimate communications (like firmware update that can lead to a change in network behavior), thus decision flow should be expanded to exclude means of eliminating possible false positives.

In an embodiment, further measures for reducing false positives may be taken such as determining a set of external sources that accessed the subset of devices before they started to report presence to the C2 server 414. This set of external sources may be checked against known IoCs to further reduce false positives. In case of an exploitation, a malicious actor may exploit a device via an open port and when a botnet is spreading, that set of external sources that accessed the devices before they started reporting their presence to the C2 server appears. In another embodiment, a connection cardinality of a device may also be considered. For example, if an IoT device usually connects to two endpoint devices, a botnet would at least add a third connection to the total cardinality.

Figure 5:
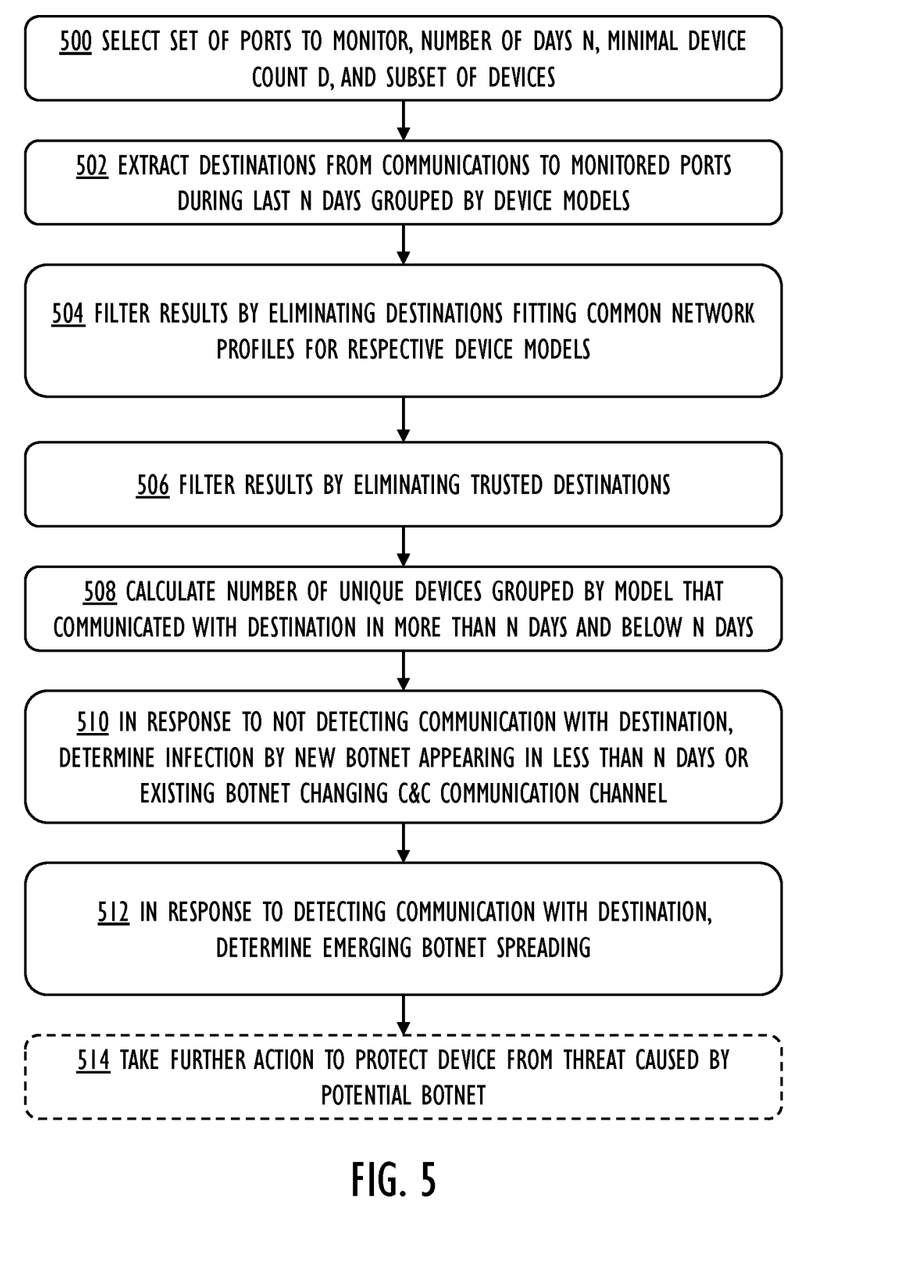
FIG. 5 a flowchart illustrating a process, according to one embodiment.

Continuous data retrieval and monitoring process according to an embodiment may comprise an indicator of compromise (IoC) (by a malicious actor) extraction logic flow illustrated in FIG. 5.

In 500, a set of ports to monitor (ex., 443, 80, or some specific used by known botnets) is selected, the number of days N, the minimal device count D, and the subset of devices (ex., specific device type, OS, etc.).

In 502, using data lake, destinations from communications to monitored ports during the last N days grouped by models where the count of devices in a group is at least D are extracted.

In 504, the results are reduced/filtered by eliminating destinations that are fitting in common network profile for the respective device models.

In 506, the results are reduced/filtered by eliminating trusted destinations (ex., trustworthy ASNs, IPs of popular services).

In 508, for each resulting destination, the number of unique devices grouped by model that had communication with the destination in more than N days and those who had not are calculated.

In 510, in response to detecting devices that had no communication with the destination, determining an infection by a new botnet appearing in less than N days or an existing botnet changing C&C communication channel.

In 512, in response to detecting devices that had communication with the destination, determining an emerging botnet spreading.

In 514, further action is taken to protect the device(s) from a security threat caused by a potential botnet.

In an embodiment, the two groups of devices mentioned in 510 and 512 are subject to further analysis. Best candidates for true IoC's are: 1. Resulting destinations are those that are known to be used in malicious activities. 2. Resulting destinations that have corresponding devices grouped by models that spot alike abnormal network activity (which can be sign of attacks against same targets).

By being able to access such a large dataset of the central data storage that includes consumer home device data, is geographically rich, and contains a count sufficiently large (e.g., 300M-700M), the embodiments of the invention enable detecting botnets that have not been detected before by other vendors, existing honeypots, etc. as they are created, begin to spread, or reconnect via backup channel when their C&C infrastructure is taken down. This is achieved by starting with historical network connections for the corpus of devices stored in the central data storage. Next steps are combining findings from the historical data with active traffic captures. This requires the ability to trigger rules to perform the traffic capture of devices with an agent on the modem/router.

Thus, no previous knowledge of botnet function or communication methods are not required—there is no need to know what the botnet is doing or how it speaks to the C&C. An embodiment of the invention may act as an early warning system and point researchers in the right direction built on an agent sensor. A diversified sensor network encompassing the country allows detection of an emerging botnet before the binaries are analyzed by the industry thereby enabling providing an early warning threat feed to industry leaders.

As a use case example, even if the community or security research providers had not been able to find C&C addresses to publish for FBOT, a known malware threat, the process according to embodiments described herein could have detected the abnormal traffic patterns and given alerts to perform further investigation. In this use case example, 14 devices were infected and then established outbound connections to 190.115.18.238:422, 9746, 768, and 43101 in a single 24-hour period. If this threat had gone unnoticed, by the time a week elapsed there might have been more than 100 devices that became infected calling home to the FBOT C&C. For example, if the current_date was 2020.03.10 and data acquisition steps according to an embodiment were executed with ignore_ports: [443, 80, . . . ], time_range: 7 days, min_device_count: 75, the traffic below could have been found without knowing that 190.115.18.238 was a C&C and without prior knowledge about the botnet. Following the data investigation steps according to an embodiment of the present invention, the IP address could have thus determined to be malicious.

Figure 6:
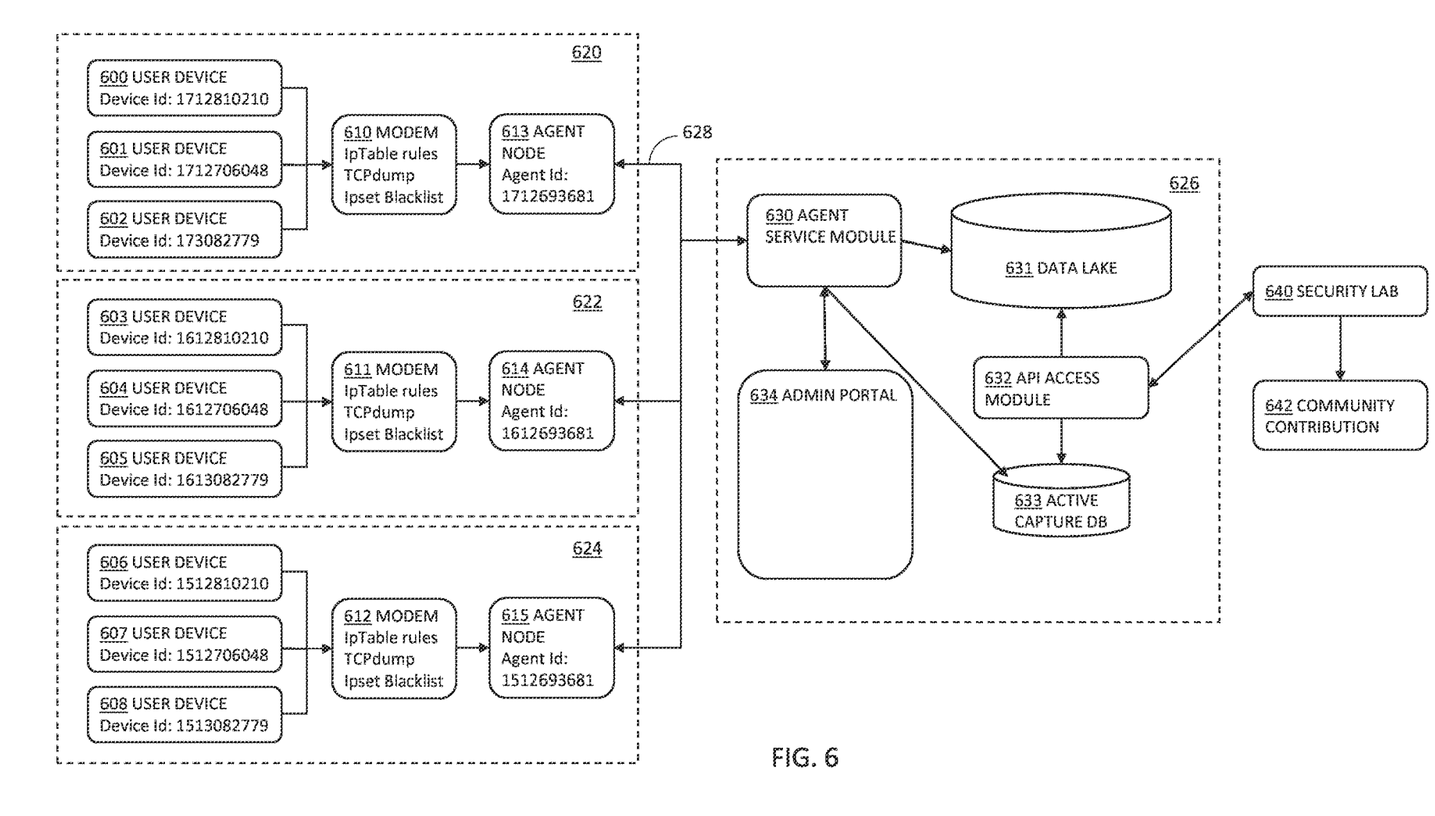
FIG. 6 is a block diagram illustrating an example system environment, according to one embodiment.

FIG. 6 illustrates an example system environment, according to another embodiment.

The system environment illustrated in FIG. 6 includes consumer home networks (local networks) 620-624 that may each include one or more devices 600-608 and one or more modems 610-612, and agent nodes 613-615. The example system also includes a security provider 626 that comprises a data repository/central data storage, here data lake 631, an agent service module 630, an admin portal 634, an active capture database 633 and an API access module 632. The example system also includes a security lab service 640 and a community contribution entity 642.

As a use case example, let us assume that the user device 602 (e.g., a digital video recorder (DVR)) is vulnerable to an RCE exploit and becomes infected with a botnet. Each device 600-608 is assigned a unique DeviceId to identify traffic patterns uploaded by an agent process 613-615 to the cloud. Each agent process of the agent nodes 613-615 runs on the modem's 610-612 firmware and is identified by a unique AgentId when communicating with the cloud over a websocket 628.

In this example use case scenario, the summary for relevant traffic records formatted as JSON are sent to cloud during normal operations for all devices. The agent service module 630 transfers the summary traffic records to the data lake 631. The date lake retention policy in this use case example is 7 days per record. The API access module 632 allows researchers to generate sql-like queries to search the data lake 631. Automated data acquisition steps may be performed for example on a weekly interval and the security lab service 640 may be notified of findings. An admin portal 634 enables creating a network traffic trigger for specified AgentId and DeviceId and then the agent service module 630 may send a capture request from the admin portal 634 to the agent nodes 613-615.

Packet capture triggered by the agent process 613 upon receipt of a command from the agent service is started by the modem 610. After the traffic capture trigger is hit and network capture is completed for a requested duration, the agent 613 uploads the cap and attaches it to a request sent to the cloud. The agent service module 630 uploads a packet capture of the traffic for desired DeviceId and AgentId to the active capture database 633.

API access 632 enables researches to download captures uploaded by the agent node 613. Security lab service 640 performs data investigation steps to determine if this is a botnet threat. If a threat is identified based on the investigation, then rules are added in the admin portal 634 for all agent nodes to block communications to/from the relevant IP address. The agent service 632 then sends blacklist request from the admin portal 634 to all agent nodes 613-615. The agent process adds the requested IP address to the IPset blacklist. Any future attempts to reach the blacklisted IP address from any device 600-608 connected to the modem 610-612 will time out. The rest of the agents protected by the security provider 626 receive the blacklist request and act accordingly. In this use case example process, a bi-weekly threat actor feed that is based on botnets discovered by the security labs service or the security provider may be provided to the community contribution entity 642 and/or offered to $3^{rd}$ parties.

It will be appreciated that various modifications may be made to the above-described embodiments without departing from the scope of the present invention. For example, the database or analysis engine may be in separate entities to the apparatus, in which case the apparatus will send queries remotely to the analysis engine.

The steps, signalling messages and related functions described above in relation to the figures are in no absolute chronological order, and some of the steps may be performed simultaneously or in a different order. Other functions may also be executed between the steps and other signalling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processor devices, computers, memory units or articles of manufacture, and may be executed by one or more processors or computers. The data storage medium or memory unit or database may be implemented within the processor device or computer apparatus, or as an external part of the processor device or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor device.

An embodiment provides a non-transitory computer-readable medium comprising stored program code comprised of computer-executable instructions. The computer program code comprises a code for maintaining a data repository comprising network traffic data related to a plurality of user devices, the network traffic data being collected from a plurality of Network Service Providers (NSP), a code for detecting a subset of the plurality of user devices start communicating with one or more same endpoint devices based on analysing the network traffic data, a code for determining a number of historical connections between each user device of the subset of the plurality of user devices and the one or more endpoint devices based on analysing historical connection data maintained in the data repository, and a code for identifying the one or more endpoint devices as a botnet in response to detecting that the number of historical connections between the subset of the plurality of the user devices and the one or more endpoint devices exceeds a predetermined threshold.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   maintaining a data repository comprising network traffic data related to a plurality of user devices in excess of one million user devices, the network traffic data being collected from a plurality of Network Service Providers (NSPs), the network traffic data identifying a plurality of endpoint devices and connections established with the plurality of endpoint devices by at least some of the plurality of user devices;
   detecting that a subset of the plurality of user devices connected with one or more endpoint devices of the plurality of endpoint devices based on analysing the network traffic data;
   determining a total quantity of historical connections between each user device of the subset of the plurality of user devices and the one or more endpoint devices based on analysing historical connection data maintained in the data repository, wherein the historical connection data maintained in the data repository is collected during a predetermined time range; and
   in response to detecting that the total quantity of historical connections between the subset of the plurality of user devices and the one or more endpoint devices exceeds a predetermined threshold, identifying the one or more endpoint devices as a suspected botnet.

2. The method according to claim 1, further comprising:
   selecting one or more communication ports for monitoring the network traffic data, a number of days to monitor, a minimal user device count to monitor, and the subset of the plurality of user devices;
   extracting the one or more endpoint devices from network communications to monitored ports during the number of days by using the data repository;
   filtering the one or more endpoint devices by eliminating endpoint devices fitting a common network profile for respective device models of the plurality of user devices; and
   filtering the one or more endpoint devices by eliminating trusted destinations.

3. The method according to claim 1, further comprising determining which user devices of the subset of the plurality of user devices communicated with the one or more endpoint devices and which user devices of the subset of the plurality of user devices did not communicate with the one or more endpoint devices, wherein the subset of the plurality of user devices are formed by grouping by one or more of: a device model, a device vendor, an operating system, and any other common property of the plurality of user devices.

4. The method according to claim 3, further comprising:
   in response to detecting one or more user devices of the subset of the plurality of user devices having had no previous communication with the one or more endpoint devices based on the determination, determining an infection that is caused by a new botnet appearing in less than N days or by an existing botnet changing a Command and Control (C&C) communication channel; and
   in response to detecting one or more user devices of the subset of the plurality of user devices having had previous communication with the one or more endpoint devices based on the determination, determining that an emerging botnet is spreading.

5. The method according to claim 1, wherein the historical connection data maintained in the data repository is related to a predetermined minimum number of the plurality of user devices.

6. The method according to claim 5, wherein the determining the total quantity of historical connections between each user device of the subset of the plurality of user devices and the one or more endpoint devices further comprises:
   grouping the historical connections by a destination Internet Protocol (IP) address and a destination communication port between a present date and a past date within the predetermined time range; and
   filtering results from the grouping to return destination IP address and destination communication port combinations, which are equal to or greater in number than the predetermined minimum number of the plurality of user devices.

7. The method according to claim 1, further comprising determining whether a destination IP address and/or a destination communication port of the one or more endpoint devices identified as a suspected botnet are malicious by one or more of:
   ensuring that the destination IP address is not owned by a company listed in a trusted list of top corporations worldwide;
   ensuring that the destination communication port of the one or more endpoint devices identified as the suspected botnet is not associated with a known service;
   searching for Classless Inter-Domain Routings (CIDRs) of known bad hosting providers implying malicious intent; and
   generating a query to determine whether, during a predetermined time range, a subset of the one or more endpoint devices generated a Denial-of-Service (DOS) attack against a same user device of the plurality of user devices.

8. The method according to claim 1, further comprising:
   in response to detecting a connection between the subset of the plurality of user devices and a suspected malicious destination IP address, requesting full network traffic to be captured for a predetermined time range for each user device of the subset of the plurality of the user devices; and
   analysing the full network traffic to verify malicious activity.

9. The method according to claim 1, further comprising:
   determining that one or more IP addresses are linked to a known bulletproof hosting service provider; and
   in response to detecting the subset of the plurality of the user devices communicating with the known bulletproof hosting service provider, identifying the one or more endpoint devices as the suspected botnet, wherein the plurality of user devices communicate with the known bulletproof hosting service provider over one or more standard communication ports.

10. The method according to claim 1, further comprising taking further action to protect one or more computer devices of a computer network from a security threat caused by the suspected botnet, wherein the taking further action comprises one or more of: blocking or preventing communication with the suspected botnet and conducting further analysis on the network traffic data and/or the suspected botnet.

11. An apparatus in a computer network system comprising:
a memory;
one or more processor devices coupled to the memory and configured to:
maintain a data repository comprising network traffic data related to more than a million user devices, the network traffic data being collected from a plurality of Network Service Providers (NSPs), the network traffic data identifying a plurality of endpoint devices and connections established with the plurality of endpoint devices by at least some of the plurality of user devices;
detect that a subset of the plurality of user devices connected with one or more endpoint devices of the plurality of endpoint devices based on analysing the network traffic data;
determine a total quantity of historical connections between each user device of the subset of the plurality of user devices and the one or more endpoint devices based on analysing historical connection data maintained in the data repository, wherein the historical connection data maintained in the data repository is collected during a predetermined time range; and
in response to detecting that the total quantity of historical connections between the subset of the plurality of user devices and the one or more endpoint devices exceeds a predetermined threshold, identify the one or more endpoint devices as a suspected botnet.

12. The apparatus according to claim 11, the one or more processor devices being further configured to ignore a set of standard communication ports when analysing the network traffic data.

13. The apparatus according to claim 11, the one or more processor devices being further configured to:
select one or more communication ports for monitoring the network traffic data, a number of days to monitor, a minimal user device count to monitor, and the subset of the plurality of user devices;
extract the one or more endpoint devices from network communications to monitored ports during the number of days by using the data repository;
filter the one or more endpoint devices by eliminating endpoint devices fitting a common network profile for respective device models of the plurality of user devices; and
filter the one or more endpoint devices by eliminating trusted destinations.

14. The apparatus according to claim 11, the one or more processor devices being further configured to determine which user devices of the subset of the plurality of user devices communicated with the one or more endpoint devices and which user devices of the subset of the plurality of user devices did not communicate with the one or more endpoint devices, and wherein the subset of the plurality of user devices are formed by grouping by one or more of: a device model, a device vendor, an operating system, and any other common property of the plurality of user devices.

15. The apparatus according to claim 14, the one or more processor devices being further configured to:

determine an infection that is caused by a new botnet appearing in less than N days or by an existing botnet changing a Command and Control (C&C) communication channel in response to detecting one or more user devices of the subset of the plurality of user devices having had no previous communication with the one or more endpoint devices based on the determination; and
determine that an emerging botnet is spreading in response to detecting one or more user devices of the subset of the plurality of user devices having had previous communication with the one or more endpoint devices based on the determination.

16. The apparatus according to claim 11, wherein the historical connection data maintained in the data repository is related to a predetermined minimum number of the plurality of user devices.

17. The apparatus according to claim 16, wherein to determine the total quantity of historical connections between each user device of the subset of the plurality of user devices and the one or more endpoint devices, the one or more processor devices are further configured to:
group the historical connections by a destination Internet Protocol (IP) address and a destination communication port between a present date and a past date within the predetermined time range; and
filter results from the grouping to return destination IP address and destination communication port combinations, which are equal to or greater in number than the predetermined minimum number of the plurality of user devices.

18. The apparatus according to claim 11, the one or more processor devices being further configured to determine whether a destination IP address and/or a destination communication port of the one or more endpoint devices identified as a suspected botnet are malicious by one or more of:
ensuring that the destination IP address is not owned by a company listed in a trusted list of top corporations worldwide;
ensuring that the destination communication port of the one or more endpoint devices identified as the suspected botnet is not associated with a known service;
searching for Classless Inter-Domain Routings (CIDRs) of known bad hosting providers implying malicious intent; and
generating a query to determine whether, during a predetermined time range, a subset of the one or more endpoint devices generated a Denial-of-Service (DOS) attack against a same user device of the plurality of user devices.

19. The apparatus according to claim 11, the one or more processor devices being further configured to:
in response to detecting a connection between the subset of the plurality of user devices and a suspected malicious destination IP address, request full network traffic to be captured for a predetermined time range for each user device of the subset of the plurality of the user devices; and
analyse the full network traffic to verify malicious activity.

20. The apparatus according to claim 11, the one or more processor devices being further configured to:
determine that one or more IP addresses are linked to a known bulletproof hosting service provider; and
in response to detecting the subset of the plurality of the user devices communicating with the known bulletproof hosting service provider, identify the one or more endpoint devices as the suspected botnet, wherein the plurality of user devices communicate with the known bulletproof hosting service provider over one or more standard communication ports.

21. A non-transitory computer-readable medium comprising stored program code, the program code comprised of computer-executable instructions that, when executed by a processor device, cause the processor device to:

maintain a data repository comprising network traffic data related to a plurality of user devices in excess of one million user devices, the network traffic data being collected from a plurality of Network Service Providers (NSPs), the network traffic data identifying a plurality of endpoint devices and connections established with the plurality of endpoint devices by at least some of the plurality of user devices;

detect that a subset of the plurality of user devices connected with one or more endpoint devices based of the plurality of endpoint devices on analysing the network traffic data;

determine a total quantity of historical connections between each user device of the subset of the plurality of user devices and the one or more endpoint devices based on analysing historical connection data maintained in the data repository, wherein the historical connection data maintained in the data repository is collected during a predetermined time range; and in response to detecting that the total quantity of historical connections between the subset of the plurality of user devices and the one or more endpoint devices exceeds a predetermined threshold, identify the one or more endpoint devices as a suspected botnet.

\* \* \* \* \*